United States Patent Office 3,313,636
Patented Apr. 11, 1967

3,313,636
FIRE RETARDANT BITUMINOUS COMPOSITIONS
Noel D. Blair, Tonawanda, and Claude Thomas Bean, Jr., Niagara Falls, N.Y., assignors to Hooker Chemical Corporation, Niagara Falls, N.Y., a corporation of New York
No Drawing. Filed Dec. 2, 1963, Ser. No. 327,504
14 Claims. (Cl. 106—15)

This invention relates to novel fire retardant bituminous compositions, and to methods for making bituminous materials fire retardant.

Bituminous materials find numerous commercial applications such as in roofing materials, which may be either asphalt shingles or in built-up roofs. Additional uses are in coated or impregnated papers, floor tiles and protective coatings, emulsions and paints, for example, for coating outdoor wooden structures. These and other uses are better served by bituminous compositions that are fire retardant and flame resistant.

Accordingly, it is an object of this invention to provide fire retardant bituminous compositions. It is a further object of this invention to provide methods for reducing the flammability of bituminous materials to the non-burning state.

Yet another object of this invention is to provide a novel bituminous composition which, when exposed to flame, will generate an intumescent insulating layer and at the same time generate gases of a low order of toxicity upon flame decomposition and destructive distillation of the bituminous film.

These and other objects of the invention will become apparent as the description of the invention and the examples illustrative of the invention are more fully set forth in the specification.

In accordance with this invention there is provided a fire retardant bituminous composition comprised of a bituminous material and a perhalocarbonyl pentadiene compound. The flame retardant characteristics of these bituminous compounds are further improved by incorporating antimony compounds therein. Perhalopentadienoic acid and its derivatives or compounds derivable therefrom, i.e., perhalopentadienoic acidic compounds, constitute the prefered class of perhalo carbonyl pentadiene compounds of this invention, conjugated dienes. However, this is not to exclude compounds such as di-(perhaloethylene) ketone and perhalo pentadiene oxide. Suitable derivatives of perhalopentadienoic acid include haloaryl substituted and haloalkyl substituted derivatives and their salts, aldehydes, acid halides and cyclic esters. Particularly suited for use in this invention are the pentadienoic acid compounds wherein the halogen is cholrine or bromine. Illustrative of the preferred perhalopentadienoic compounds are perchloropentadienoic acid, trichlorophenyl tetrachloropentadienoic acid, bis(trichlorophenyl) trichloropentadienoic acid, perhalo alkyl perchlorocoumalin, perchlorocoumalin, and the corresponding bromine analogs, perfluoro pentadienoic acid, and mixed halogen compounds, such as tribromo phenyl tetrachloropentadienoic acid.

The perchlorocoumalin utilized in this invention may be prepared by any desired method and may be satisfactorily prepared by the following route. Octachlorocyclopentene is warmed with concentrated sulfuric acid and the resulting hexachloro-2-pentenone layer is separated and added to an aqueous solution of sodium hydroxide to form the sodium salt of cis-pentachloropentadienoic acid. The free acid is generated by acidification of the sodium salt with a mineral acid and the cis-pentachloropentadienoic acid, which can be isolated by filtration or extraction, is then subjected to elevated temperature to effect the preparation of perchlorocoumalin.

In the foregoing description of the fire retarding compounds of this invention the terms alkyl and aryl, unless otherwise qualified, are used as described below. Alkyl groups contain from 1 to 6 carbon atoms. Aryl includes aromatic compounds having from 6 to 12 carbon atoms. The most preferred aryl is phenyl.

Many types of bituminous materials are commercially available, ranging from those derived from petroleum (asphaltic products) to those derived from coal tar. The asphaltic products include native asphalts, residual asphalts, blown petroleum asphalts precipitated by propane, fatty-acid pitches, and asphalts modified with oil such as linseed oil, cotton seed oil, castor oil, vegetable oils, and animal oils, and various mixtures thereof. The tar products include pitch obtained by distilling the highly volatile oils from coal tar as well as combinations thereof with oil, gas tar and water gas tar. These materials are provided in the form of semi-liquids to semi-solids when they are to be used for impregnating felted or woven fabrics in roofing or insulating compositions. The same groups of substances are also commonly prepared with a higher consistency and also with a higher fusing point. These latter materials are primarily used for coating or adhesive compositions. The foregoing list of bituminous materials is set forth to provide a better understanding of the type of material contemplated by the term bituminous material but these and other bituminous materials are useful in the present invention.

The fire retarding compounds of the present invention are desirably incorporated in the bituminous materials in an effective fire retardant proportion. Generally, these fire retarding compounds are mixed with bituminous compositions in a proportion of from about 2 to about 50 percent by weight and preferably from about 3 to 30 percent by weight. Improved fire retardants can be provided by incorporating antimony compounds in the bituminous compositions in the amount of about 1 to about 10 percent by weight of said bituminous composition, preferably about 5%.

Antimony oxide is the antimony compound that is presently preferred for use in the present invention. However, many antimony compounds are suitable. Suitable antimony compounds include the sulfides of antimony, the alkali metal salts of Group 1 of the Periodic Table, antimony salts of organic acids and their pentavalent derivatives and the esters of antimonous acids and their pentavalent derivatives. It is convenient to employ sodium antimonite or potassium antimonite as an alkali metal salt of antimony for compositions of this invention. United States Patent 2,996,528 discloses suitable antimony salts of organic acids and their pentavalent derivatives. Compounds of this class include antimony butyrate, antimony valerate, antimony caproate, antimony heptylate, antimony caprylate, antimony perlargonate, antimony caprate, antimony cinnamate, antimony anisate, and their pentavalent dihalide derivatives. Likewise the esters of antimonous acids and their pentavalent derivatives disclosed in U.S. Patent 2,993,924 such as tris(n-octyl) antimonite, tris(2-ethylhexyl) antimonite, tribenzyl antimonite, tris(beta-chloroethyl) antimonite, and their pentavalent dihalide derivatives. Still other suitable organic antimony compounds are the cyclic antimonites such as trimethylol propane antimonite, pentaerythritol antimonite and glycerol antimonite.

The fire retardant compounds of this invention additionally exert a stabilizing influence on the bituminous composition. These retardants possess high melting points and tend to remain in the solid state despite the application of heat, thereby materially reducing the flow of the bituminous material and its ability to spread fire by the dripping of flaming molten bituminous materials. Additionally, the fire retarding compounds of this invention impart a high degree of flexibility to bituminous coatings which is highly desirable when impregnating papers, felts and so forth.

The bituminous compositions have been applied to the substrate with the aid of heat and/or pressure in order to achieve a uniform coating with satisfactory bonding characteristics between the coating and the substrate. However, in many cases the use of heat and/or pressure to achieve a coating has not been convenient and in such cases a solvent has been used to reduce the viscosity of composition to a brushable, sprayable or otherwise pliable consistency. The solvent method is a convenient method for applying bituminous coatings to roofs, fences, bridges, etc., but it suffers from the fire hazards usually associated therewith when an inflammable solvent is employed. Therefore, it is another aspect of this invention to provide fire retardant bituminous compositions for use with the solvent method of applying bituminous compositions to substrates. These fire retardant coating compositions may contain from about 5 to 85 percent and usually from about 30 to about 75 percent of the bituminous fire retardant compositions as previously described. Preferably, the compositions will contain from about 50 to 70 percent bituminous fire retardant composition. The balance of the coating composition is a volatile halogenated hydrocarbon solvent which is compatible with the fire retardant compounds in the bituminous materials.

The halogenated hydrocarbon solvent of the present composition results in compositions of viscosities in the range of 10 to 1000 centipoises at 25 degrees centigrade. The products of higher viscosity may be thinned by the application of heat in a controlled fashion. Clearly, one does not have to apply as much heat to thin such compositions to the desired viscosity as would be needed in the absence of the solvent.

The preferred solvent has the boiling point which allows for the rapid evaporation thereof after the application of the invented fire retardant bituminous compositions, yet is employed in such proportion and is of such properties that uniform coatings are obtained when the composition is applied by spray means. The desired boiling point is usually in the range of about 30 degrees to about 200 degrees centigrade and preferably is within 40 degrees to 150 degrees centigrade. The halogenated solvents described are not flammable and exert a "snuffing action," preventing or inhibiting ignition of the coating composition while it is being applied. This snuffing action is particularly important when the invented composition is being sprayed so that minute particles and vapors of bituminous matter are not ignited. The preferred solvent in the invented fire retardant bituminous composition is trichloroethylene, although other halogenated hydrocarbon solvents, preferably chlorinated unsaturated hydrocarbons from 1 to 2 carbon atoms, are used successfully, too. Among the satisfactory solvents, listed with their boiling points are the following:

| Solvent: | Boiling point, ° C. |
| --- | --- |
| Methylene chloride | 40 |
| Trichlorotrifluoroethane | 46 |
| 1,2-dichloroethylene | 60 |
| Chloroform | 61 |
| Trichloroethane | 74 |
| Carbon tetrachloride | 77 |
| Trichloroethylene | 87 |
| Tetrachlorodifluoroethane | 92 |
| Bromochloroethane | 107 |
| Dibromoethane | 110 |
| Perchloroethylene | 121 |
| Unsym-tetrachloroethane | 130 |
| Sym-tetrachloroethane | 146 |

Mixtures of the above solvents may also be used to obtain the exact evaporation rate, viscosity, flash-fire inhibition or other property desired, with the present compositions.

The following examples are presented to illustrate the invention further, without any intention of being limited thereby. All parts and percentages are by weight and all temperatures are in degrees centigrade, unless otherwise indicated.

*Example 1.—Base material*

60.5 parts of asphalt were heated to 200 degrees until melted. The molten asphalt was then removed from the source of heat and 32.5 parts of mineral spirits were added with stirring. Stirring was continued and 7.0 parts of finely divided asbestos fiber (Quebec Asbestos Standard Grade 7R) were added. The mixture was then cooled to room temperature and used as base material for the flame retardant compositions of the following examples. When it is desirable to prepare compositions with other solvents, such as trichloroethylene, the above procedure is used, except that the desired solvent is substituted for a like amount of the mineral spirits of Example 1.

*Example 2.—Fire retardant compositions*

To 100 parts of the base material of Example 1 were added 18.2 parts (30 percent based on asphalt content) of pentachloropentadienoic acid and three parts (5 percent based on asphalt content) of antimony oxide and the composition was stirred until uniform. The halogen content of this composition was 13.4 percent.

A coating was prepared on three inch by twelve inch saturated asphalt felt (used as an intermediate in the manufacture of composition shingles) by applying the above composition with a knife at a coverage rate of two gallons for each 100 square feet (or a film of about $\frac{1}{16}$ of an inch). The strips were allowed to dry until substantially all of the mineral spirits was removed.

Testing was performed to determine the relative flammability of the coating by supporting the strip at an angle of 60 degrees from the vertical, in a draft free hood, and applying a flame from a compressed propane portable blow torch. The torch flame was adjusted to give a 1½ inch inner blue cone and was applied perpendicular to the face of the strip for a period of 15 seconds, after which it was removed. The self-extinguishing time was recorded. A second 15 second flame application was made immediately after the first flame was extinguished and the self-extinguishing time for the second application was also recorded. If the specimen was self-extinguishing or did not burn upon the second ignition, it was judged to be self-extinguishing by this test. Intumescence was measured at the highest point of rise.

The composition of this invention was self-extinguishing in 2.1 seconds after the first ignition and in 3.1 seconds after the second ignition. An intumescence of 0.25 inch was observed. The composition was considered to be non-burning.

In a manner similar to Example 2, other compositions were prepared and tested and are summarized in the table below:

| Example | Fire Retardant | Parts of Retardant | Parts of $Sb_2O_3$ | Self Extg. Time (sec) 1st Appln. | Self Extg. Time (sec) 2nd Appln. | Intumescence (In.) | Flammability |
| --- | --- | --- | --- | --- | --- | --- | --- |
| 3 | Trichlorophenyl tetrachloropentadienoic acid | 18.2 | 3.0 | 3.0 | 6.5 | 0.36 | Non-burning. |
| 4 | Perchlorocoumalin | 18.2 | 3.0 | 1.3 | 4.6 | 0.17 | Do. |
| 5 | | | | Burns 2.9 | Burns 16.5 | None | Burns. |
| 6 | Bis(trichlorophenyl) trichloropentadienoic acid | 18.2 | 3.0 | | | 0.50 | Non-burning. |

Similar results will be obtained when the substituent group of Examples 3 and 6 is alkyl rather than aryl, such as perbromo or perchloro methyl or ethyl substituents.

A second aspect of this invention, reduction of fire hazard during application is illustrated by Example 7.

*Example 7*

A composition containing 60.5 parts of asphalt, 7.0 parts of asbestos (Grade 7R), 6.1 parts (10 percent based on asphalt content) of pentachloropentadienoic acid and 32.5 parts of trichloroethylene was prepared. The composition was tested in the manner of Example 2 except that the solvent was not allowed to dry, so as to simulate a fire hazard existing during application of a bituminous coating to an existing roof.

The composition of this example was self-extinguishing in 1.8 seconds after the first ignition and in 4.2 seconds after the second ignition. An intumescence of 0.34 inch was observed. The composition was considered to be non-burning.

Results similar to Example 7 are obtained when the solvent is methylene chloride, tetrachlorodifluoroethane, dibromoethane or perchloroethane.

In the foregoing examples, it is evident that not only are the compositions in the instant invention fire resistant, but also as the halogen content of the coating is increased any dripping tendency of the coating decreases and intumescence is observed. Herein lies a great advantage of the invention over prior methods for fire proofing bituminous compositions. The presence of our halogenated compounds and bituminous coatings maintains the viscosity of these coatings high even at elevated temperatures. By contrast, conventional bituminous compositions drip and run in contact with flames, thereby increasing the fire hazard by spreading the hot melt over the environment.

The temperature of mixing the components of the invention is not critical, ranging from the temperature at which the bituminous material becomes fluid up to the decomposition temperature of the said bituminous material, e.g. about 20 degrees to about 260 degrees centigrade.

The "stabilized" asphalt used in the examples contained asbestos fiber. It is also within the scope of the present invention to use unstabilized asphalts and other bituminous materials as well as to employ other powdered or fiberous fillers, pigments and so forth, that are known in the art. Such substances may be either inorganic or organic in origin and are used to impart weather resistance, to impart color to the surface coatings and for reducing the cost of the finished product. Commonly used additives include silica, limestone, slate dust, clay, black and colored pigments, and calcium carbonate. Various halogenated wax products may also be incorporated in the compositions of the invention.

The present bituminous compositions find many commercial applications. They are useful for saturating felts that are subsequently used as shingles or are an intermediate product in the manufacture of prepared roofings and composition shingles, for constructing built-up roofs, for the manufacture of bituminized floor coverings, for water-proofing cloths, such as tarpaulin, and other applications in which bituminous saturated felts are commonly used. These bituminous compositions can be used in many coating applications such as in the manufacture of shingles, siding for home construction, wrapping and packing paper, electrical transmission wire insulation, cords and ropes, bituminized wall board, insulating board and the like, bituminous pipe and asphalt mastic roofs. Other applications include bituminous lacquers and cements. In all such applications, the industrial requirements are becoming more stringent regarding the use of fire retardant bituminous compositions. The compositions of our invention satisfy this fast growing need.

Various changes and modifications may be made and equivalents may be substituted in the invented method. Products and compositions, contain the preferred forms of the compounds which have been herein described, without departing from the scope of this invention.

What we claim is:

1. A fire retardant bituminous composition comprising of a bituminous material and a perhalo carbonyl pentadiene selected from the group consisting of perhalopentadienoic acid, haloaryl perhalopentadienoic acid wherein each aryl has from 6 to 12 carbon atoms, perhaloalkyl perhalopentadienoic acid wherein each alkyl has from 1 to 6 carbon atoms, the sodium salt of said perhalopentadienoic acid, the sodium salt of said haloaryl perhalopentadienoic acid, the sodium salt of said perhaloalkyl perhalopentadienoic acid, perhalocoumalin, haloaryl perhalocoumalin wherein each aryl has from 6 to 12 carbon atoms, perhaloalkyl perhalocoumalin wherein each alkyl has from 1 to 6 carbon atoms, di(perhaloethylene) ketone, perhalopentadiene oxide, and wherein each halogen is selected from chlorine, bromine and fluorine, in sufficient proportion to improve the fire retardancy of the bituminous material.

2. A fire retardant bituminous composition comprising of a bituminous material, a perhalo carbonyl pentadiene selected from the group consisting of perhalopentadienoic acid, haloaryl perhalopentadienoic acid wherein each aryl has from 6 to 12 carbon atoms, perhaloalkyl perhalopentadienoic acid wherein each alkyl has from 1 to 6 carbon atoms, the sodium salt of said perhalopentadienoic acid, the sodium salt of said haloaryl perhalopentadienoic acid, the sodium salt of said perhaloalkyl perhalopentadienoic acid, perhalocoumalin, haloaryl perhalocoumalin wherein each aryl has from 6 to 12 carbon atoms, perhaloalkyl perhalocoumalin wherein each alkyl has from 1 to 6 carbon atoms, di(perhaloethylene) ketone, perhalopentadiene oxide, and wherein each halogen is selected from chlorine, bromine and fluorine, in sufficient proportion to improve the fire retardancy of the bituminous material and an antimony compound in sufficient proportion to improve the fire retardancy of the bituminous material.

3. A composition according to claim 1, wherein the perhalo carbonyl pentadiene is a perhalopentadienoic acidic compound, wherein each halogen is selected from chlorine, bromine and fluorine.

4. A composition according to claim 2 in which the perhalo carbonyl pentadiene is a perhalopentadienoic acidic compound, wherein each halogen is selected from chlorine, bromine and fluorine.

5. A composition according to claim 4 wherein the antimony compound is antimony oxide.

6. A composition according to claim 3 containing pentachloropentadienoic acid.

7. A composition according to claim 3 containing trichlorophenyl tetrachloropentadienoic acid.

8. A composition according to claim 3 comprising perchlorocoumalin.

9. A composition according to claim 3 comprising bis(trichlorophenyl) trichloropentadienoic acid.

10. A fire retardant bituminous composition comprising the composition of claim 1 and a halogenated hydrocarbon solvent.

11. A method of applying a fire retardant bituminous composition to a surface to be coated which comprises applying the composition of claim 10 to the surface to be coated and evaporating the halogenated hydrocarbon from said surface during the application and afterwards to reduce the flammability of the composition at such times and to leave on the surface a fire retardant bituminous coating.

12. A fire retardant bituminous roof shingle containing a bituminous material and perhalo carboxyl pentadiene.

13. A fire retardant bituminous composition comprising a bituminous material and a halogenated compound selected from the group consisting of perhalopentadienoic acid, haloaryl perhalopentadienoic acid wherein each aryl has from 6 to 12 carbon atoms, perhaloalkyl perhalopentadienoic acid wherein each alkyl has from 1 to 6 carbon atoms, the sodium salt of perhalodienoic acid, the sodium salt of said haloaryl perhalopentadienoic acid, the sodium salt of said perhaloalkyl perhalopentadienoic acid, perhalocoumalin, haloaryl perhalocoumalin wherein each aryl has from 6 to 12 carbon atoms, perhaloalkyl perhalocoumalin wherein each alkyl has from 1 to 6 carbon atoms, di(perhaloethylene) ketone, perhalopentadiene oxide, and wherein each halogen is selected from chlorine, bromine and fluorine, in sufficient proportion from about 3 to about 50 percent by weight in the bituminous composition, to improve the fire retardancy of the bituminous material.

14. A fire retardant bituminous composition comprising a bituminous material, from about 3 to about 50 percent by weight of a halogenated compound selected from the group consisting of perhalopentadienoic acid, haloaryl perhalopentadienoic acid wherein each aryl has from 6 to 12 carbon atoms, perhaloalkyl perhalopentadienoic acid wherein each alkyl has from 1 to 6 carbon atoms, the sodium salt of perhalodienoic acid, the sodium salt of said haloaryl perhalopentadienoic acid, the sodium salt of said perhaloalkyl perhalopentadienoic acid, perhalocoumalin, haloaryl perhalocoumalin wherein each aryl has from 6 to 12 carbon atoms, perhaloalkyl perhalocoumalin wherein each alkyl has from 1 to 6 carbon atoms, di(perhaloethylene) ketone, perhalopentadiene oxide, and wherein each halogen is selected from chlorine, bromine, and fluorine and from one to 10 percent by weight of antimony oxide, the halogenated compound and antimony oxide being present in sufficient proportion to improve the fire retardancy of the bituminous material.

References Cited by the Examiner

UNITED STATES PATENTS

| 3,121,067 | 2/1964 | Nelson et al. | 252—8.1 XR |
| 3,151,992 | 11/1964 | Blair et al. | 106—15 |
| 3,210,177 | 11/1965 | Hoch | 106—15 XR |

ALEXANDER H. BRODMERKEL, *Primary Examiner.*

J. B. EVANS, *Assistant Examiner.*

UNITED STATES PATENT OFFICE
CERTIFICATE OF CORRECTION

Patent No. 3,313,636                          April 11, 1967

Noel D. Blair et al.

It is hereby certified that error appears in the above numbered patent requiring correction and that the said Letters Patent should read as corrected below.

Column 1, line 44, for "prefered" read -- preferred --; line 52, for "cholrine" read -- chlorine --; column 6, lines 30 and 31, 47 and 48, for "comprising of", each occurrence, read -- comprising --; column 7, lines 5 and 7, for "comprising", each occurrence, read -- containing --.

Signed and sealed this 10th day of June 1969.

(SEAL)
Attest:

Edward M. Fletcher, Jr.                      WILLIAM E. SCHUYLER, JR.
Attesting Officer                               Commissioner of Patents